(12) United States Patent
Baart et al.

(10) Patent No.: US 9,644,681 B2
(45) Date of Patent: May 9, 2017

(54) LOW-FRICTION DYNAMIC SEAL

(71) Applicants: Pieter Baart, Heiloo (NL); Maurizio Martinetti, Bruino (IT); Michel Organisciak, Utrecht (NL); Massimiliano Ribet, Pomaretto (IT)

(72) Inventors: Pieter Baart, Heiloo (NL); Maurizio Martinetti, Bruino (IT); Michel Organisciak, Utrecht (NL); Massimiliano Ribet, Pomaretto (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/830,844

(22) Filed: Aug. 20, 2015

(65) Prior Publication Data

US 2016/0061266 A1    Mar. 3, 2016

(30) Foreign Application Priority Data

Aug. 26, 2014  (GB) .................................. 1415047.8

(51) Int. Cl.
*B61F 15/12* (2006.01)
*F16C 33/80* (2006.01)
(Continued)

(52) U.S. Cl.
CPC .......... *F16C 33/805* (2013.01); *F16C 19/385* (2013.01); *F16C 33/7813* (2013.01);
(Continued)

(58) Field of Classification Search
CPC .. F16C 19/385; F16C 33/7813; F16C 33/782; F16C 33/805; F16C 2326/10;
(Continued)

(56) References Cited

U.S. PATENT DOCUMENTS 835,694 A    11/1906 Wild
5,588,210 A    12/1996 Lederman
(Continued)

FOREIGN PATENT DOCUMENTS

DE    19600125 A1    7/1997
JP    2005147356 A    6/2005

*Primary Examiner* — James Pilkington
(74) *Attorney, Agent, or Firm* — Bryan Peckjian; SKF USA Inc. Patent Dept.

(57) ABSTRACT

A sealing arrangement, for sealing of a radial gap between relatively rotatable inner and out components, whereby the inner component is rotational about an axis of rotation and the outer component is coaxially arranged around the inner component. The sealing arrangement comprises: a dynamic seal part mountable to the inner component; a static seal part mountable to the outer component; and first and second labyrinth seals, each being formed by a gap between at least one set of opposing surfaces on the static and dynamic seal parts, and a lip seal arranged radially between the first and second labyrinth seal. The lip seal comprises a sealing lip connected to the dynamic seal part and bears against a radially oriented counterface on the static seal part. The sealing lip has a longitudinal extension in a radial cross section that extends towards the rotation axis at an angle between 10° and 80°.

6 Claims, 1 Drawing Sheet

(51) Int. Cl.
 *F16C 19/38* (2006.01)
 *F16J 15/16* (2006.01)
 *F16J 15/3264* (2016.01)
 *F16C 33/78* (2006.01)

(52) U.S. Cl.
 CPC ......... *F16J 15/164* (2013.01); *F16J 15/3264* (2013.01); *F16C 19/386* (2013.01)

(58) Field of Classification Search
 CPC .... F16J 15/164; F16J 15/3204; F16J 15/3264; F16J 15/447; F16J 15/4472; F16J 15/4474; F16J 15/4476; F16J 15/4478; F01D 11/00; F01D 11/02
 USPC .................................................. 384/480, 484
 See application file for complete search history.

(56) References Cited

U.S. PATENT DOCUMENTS

| | | | | |
|---|---|---|---|---|
| 5,813,675 | A * | 9/1998 | Otto | F16C 33/7879 277/407 |
| 6,485,185 | B1 * | 11/2002 | Conway, Jr. | F16C 19/364 384/480 |
| 6,845,986 | B2 * | 1/2005 | Hood | F16C 33/765 277/409 |
| 8,646,985 | B2 * | 2/2014 | Docimo | F16C 19/38 384/480 |
| 2009/0085301 | A1 | 4/2009 | Suzuki et al. | |
| 2011/0262063 | A1 | 10/2011 | Dittmar et al. | |
| 2012/0223484 | A1 * | 9/2012 | Yamamoto | F16C 41/007 277/309 |
| 2015/0001810 | A1 | 1/2015 | Broadbent | |

\* cited by examiner

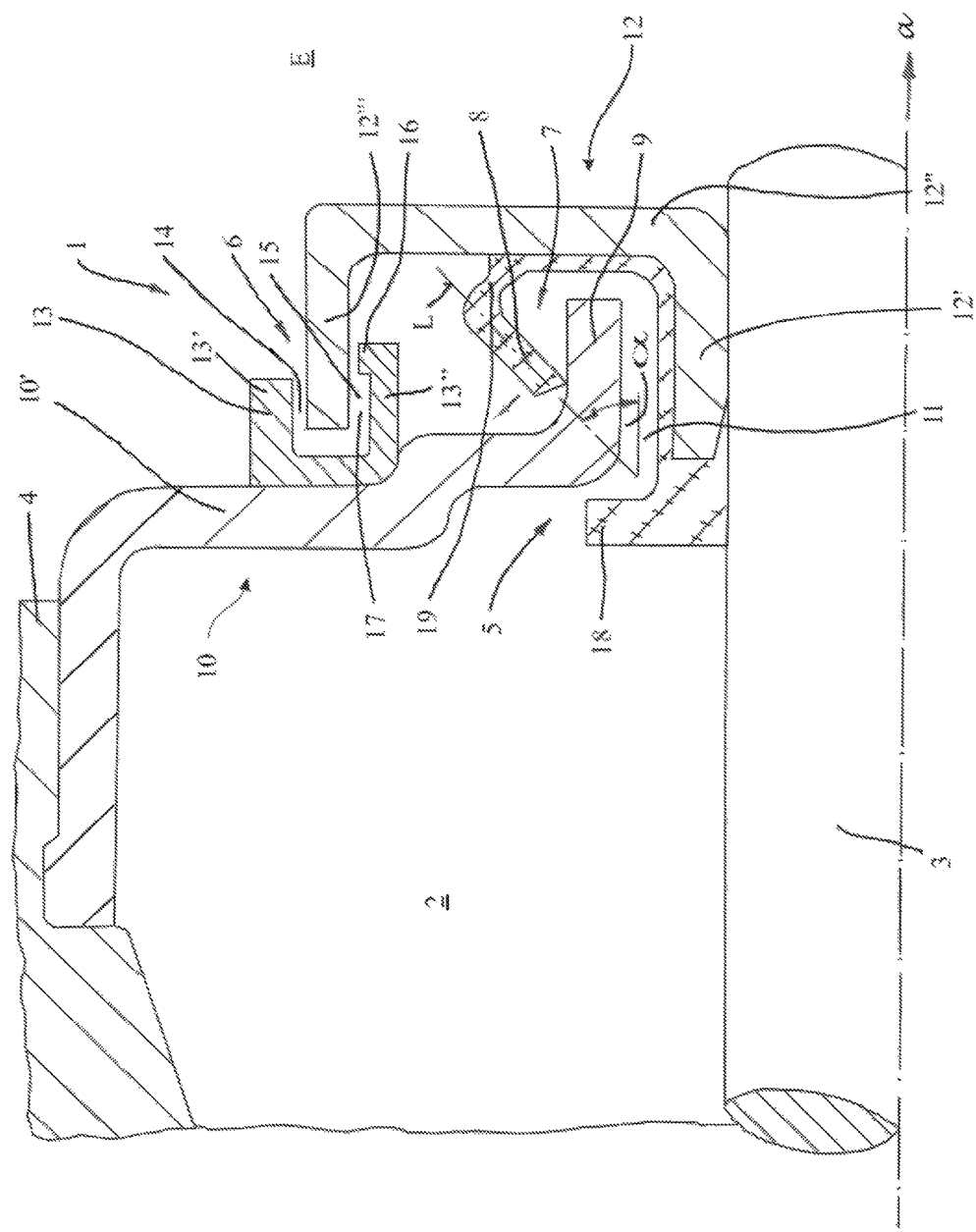

LOW-FRICTION DYNAMIC SEAL

CROSS REFERENCE TO RELATED APPLICATIONS

This is a Non-Provisional Patent Application, filed under the Paris Convention, claiming the benefit of Great Britain (GB) Patent Application Number 1415047.8, filed on 26 Aug. 2014, which is incorporated herein by reference in its entirety.

TECHNICAL FIELD

The invention relates to a sealing arrangement, for sealing a radial gap between a rotating inner component, such as a shaft, and a stationary outer component such as a bearing housing. More particularly, the invention relates to a sealing arrangement which generates low friction at high rotational speeds.

BACKGROUND

Machines comprising rotating parts generally require seal units to prevent the entry of moisture and contaminants into e.g. a bearing that supports the rotating part, and to prevent the leakage of grease that lubricates the bearing. Radial lip seals are one example of a commonly used seal. The seal has a contact lip that bears against a counterface, which ensures effective sealing under static conditions. Under dynamic conditions, the lip is in sliding contact with the counterface, which generates friction and heat, meaning that conventional lip seals are often unsuitable for use at high rotational speeds.

One application where effective sealing is important under static conditions and at high speeds is in the field of railway bearings. In compact Traction Bearing Units, for example, which operate at speeds over 200 km/hr, excessive friction and heat generation would quickly lead to wear and early seal failure. Consequently, non-contact labyrinth seals are sometimes employed in such bearing units. An example is disclosed in U.S. Pat. No. 8,356,941. A drawback of labyrinth seals, however, is that they may not provide effective sealing under static conditions, unless the gaps between opposing labyrinth surfaces are very small. The tolerance requirements in such sealing arrangements are therefore stricter.

Consequently, there is room for improvement.

SUMMARY OF THE INVENTION

The present invention resides in a sealing arrangement for sealing a radial gap between relatively rotatable inner and outer components, whereby the inner component is rotational about an axis of rotation and the outer component is arranged coaxially around the inner component. The sealing arrangement comprises a static part, adapted for mounting to the outer component, and a dynamic part adapted for mounting to the inner component. The sealing arrangement comprises a first labyrinth seal and a second labyrinth seal, each of which is formed by a gap between at least one set of opposing surfaces on the static and dynamic seal parts. The sealing arrangement further comprises a lip seal that is arranged radially between the first and second labyrinth seals. The lip seal comprises a sealing lip connected to the dynamic seal part, which bears against a radially oriented counterface on the static seal part. The sealing lip has a longitudinal extension in a radial cross section, which extends towards the rotation axis at an angle of between 10° and 80°, when the dynamic seal part is stationary.

The sealing lip is thus adapted to deflect away from the counterface under the action of centrifugal force, thereby reducing a contact force of the lip as speed increases, which in turn minimizes the increase in friction. At a certain high speed, the lip will lift off from the counterface, but this will not impair the overall sealing action of the sealing arrangement as the first and second labyrinth seals have optimal sealing effect at high speed. The sealing arrangement therefore provides effective sealing under static and low-speed conditions and provides effective, low-friction sealing at high speeds. Preferably, the sealing lip is angled in longitudinal direction, relative to the rotation axis, with an angle of between 30° and 60°.

In one example, the sealing lip is made of an elastomeric material that is connected to a radially extending flange portion of the dynamic seal part in e.g. a moulding process. The connection between the longitudinal extension of the sealing lip and the flange portion may suitably comprise a hinge point, about which the lip can pivot under the action of centrifugal force. The hinge point may be formed by a relatively thin section of elastomeric material.

At speeds below the lift-off speed, the sealing lip is in sliding contact with the counterface. To reduce friction even further, this sliding contact is preferably lubricated with a seal grease that is specially adapted for sealing applications. Typically, the space sealed by the seal arrangement of the invention will contain a rolling element bearing, in particular a double-row taper roller bearing for railway applications. The bearing is lubricated with a grease suitable for rolling contacts. When a different seal grease is used, it is important to keep the different greases separate. This function is performed by the first labyrinth seal.

The first labyrinth seal lies radially inward of the lip seal and is at least partly formed by an annular gap between a cylindrical mounting portion of the dynamic seal part and an opposing cylindrical portion of the static seal part. In a preferred example, the dynamic seal part further comprises a radial extension at the axially inner side (bearing side), which extension radially overlaps the annular gap of the first labyrinth seal. The radial extension forms an additional barrier between the lip seal and the space which is sealed by the seal arrangement as a whole.

The radial extension may be formed from the same material as the sealing lip and may be joined to the dynamic seal part in the same process. Alternatively, the radial extension may be formed by a section of the cylindrical mounting portion of the dynamic seal part, which section is bent radially outwards after the static and dynamic seal parts have been assembled.

The first labyrinth seal, the lip seal and the second labyrinth seal are preferably arranged substantially at the same axial location. This allows a compact design. The three mentioned sealing elements are thus arranged one above the other in a radial cross section.

The second labyrinth seal lies radially outward of the lip seal and has the primary function of preventing the entry of contaminants into the seal arrangement. In one example, the second labyrinth seal has a U-shaped geometry formed by an axial gap between opposing axially oriented surfaces of the static and dynamic seal parts, and by first and second annular gaps between a first set and a second set of opposing radially oriented surfaces on the static and dynamic seal parts.

Suitably, the static seal part comprises a U-shaped member having a radially inner leg and a radially outer leg. The dynamic seal part suitably comprises an outer cylindrical portion that extends between the radially inner and outer legs, to create the aforementioned gaps of the second labyrinth seal.

Thus, according to the present invention, the seal arrangement has a complex labyrinth seal to prevent contamination from reaching the sealing lip, which lip is adapted to deflect away from the counterface on the static seal part under the action of centrifugal force. The seal arrangement thus provides effective, low-friction sealing at high rotational speeds. Furthermore, a labyrinth seal prevents grease from the sealed space entering the seal arrangement, making it possible to use a specific grease in the seal.

These and other advantages of the invention will become apparent from the following detailed description and accompanying FIGURE.

BRIEF DESCRIPTION OF THE DRAWING

FIG. 1 shows an embodiment of the invention, more specifically, a radial cross section through a seal arrangement that is mounted to a railway bearing unit.

DETAILED DESCRIPTION OF THE INVENTION

In FIG. 1, a seal arrangement is shown which forms part of a railway bearing unit. A sealing arrangement 1 seals a bearing arrangement 2 (not shown in detail) against the environment E. The bearing arrangement 2 supports a rotation shaft 3 in a stationary housing 4 (the housing can also be the outer bearing ring). The shaft 3 rotates around an axis a.

The sealing arrangement 1 comprises three sealing elements, namely: a first labyrinth seal 5 and a second labyrinth seal 6 and a lip seal 7, which is arranged radially between the two labyrinth seals 5 and 6.

Specifically, the arrangement comprises a dynamic seal part 12 that is mounted to the shaft 3 and comprises a static seal part 10 that is mounted to the housing 4. The static seal part comprises a flange portion 10' that extends in a radially inward direction from an outer cylindrical mounting portion. In addition, the static seal part comprises an inner cylindrical portion 9 that extends from the static flange portion 10' in an axially outward direction. Suitably, these portions are part of a deformed tubular element that is made of e.g. sheet metal.

The dynamic seal part 12, comprises a cylindrical mounting portion 12' (fitted to the shaft 3) and a flange portion 12" that extends from the mounting portion in a radially outward direction. In addition, an outer cylindrical portion 12''' extends from the dynamic flange portion 12" in an axially inward direction, towards the static flange portion 10' of the static seal part. Again, the aforementioned portions of the dynamic seal part suitably form part of a deformed tubular element that is made of e.g. sheet metal.

The first labyrinth seal 5 is at least partly formed by an annular gap 11 between a radially inner surface of the cylindrical portion 9 of the static seal part 10 and a radially outer surface of the cylindrical mounting portion 12' of the dynamic seal part 12.

The dynamic seal part further comprises an elastomeric sealing lip 8 that extends in a longitudinal direction L of the lip towards the rotation axis a. The sealing lip 8 is joined to the dynamic flange portion 12" and has a longitudinally shaped body, which extends at an angle α relative to the rotation axis a. A contact surface of the sealing lip 8 bears against a counterface on the static seal part 10, formed by a radially outer surface of the cylindrical portion 9. In the depicted example, the angle α is approximately 45 degrees. Further, the elastomeric sealing lip 8 is joined to the flange portion 12" of the dynamic seal part 12 via a relatively thin section of the elastomeric material. This relatively thin section acts as a hinge point 19 about which the sealing lip 8 can pivot. Thus, under the action of centrifugal force during rotation of the dynamic seal part, the sealing lip 8 will be urged away from the counterface (in the direction of the unreferenced arrow shown in FIG. 1).

Accordingly, the contact force between the sealing lip 8 and the counterface on the cylindrical portion 9 is reduced during rotation of the shaft 3. At a sufficient rotational speed, the sealing lip 8 will lift off from the cylindrical portion, enabling low-friction sealing at the high rotation speeds in excess of e.g. 200 km/hr, which are common for railway bearing units. As will be understood, the sealing lip may be designed to lift off at a predetermined rotational speed, depending on the application.

Advantageously, the lip seal 7 is provided with a grease lubricant, for minimizing friction at speeds below the take-off speed. Suitably, the seal grease is specially adapted for sliding contacts and may be a different grease from a bearing grease that lubricates the bearing arrangement 2. Under dynamic conditions, the first labyrinth seal 5 ensures that the two different greases remain separated.

To ensure separation under static conditions, the dynamic seal part preferably comprises a second radial protrusion 18, which extends from the shaft mounting portion 12' at an axially inner side (bearing side), and which slightly overlaps in radial direction the flange portion 10' of the static seal part. In the depicted embodiment, the second radial protrusion 18 is formed from the same elastomeric material that is bonded to the dynamic seal part 12 for creating the sealing lip 8. The elastomeric protrusion 18 has some flexibility, enabling the dynamic and static parts of the seal to be assembled in axial direction by elastically deforming the protrusion 18. In a further embodiment (not shown), at least the radially inner surface of the shaft mounting portion of the dynamic seal part 12 is covered with a layer of elastomeric material, to reduce stress on the shaft 3.

The second radial protrusion 18 may also be formed by an axial extension of the shaft mounting portion 12', which is bent radially outwards after the dynamic and static parts of the seal have been assembled in axial direction.

The seal arrangement 1 is also designed to prevent contaminants from the environment E entering the sealed space where the bearing arrangement 2 is located. The second labyrinth seal 6 plays an important role in this sealing function, especially at high speeds when the sealing lip 8 lifts off from the counterface. The second labyrinth seal is preferably formed by a U-shaped gap, formed from first and second annular gaps and an axial gap.

In the depicted embodiment, the static seal part comprises an essentially U-shaped member 13, mounted at an axially outer side of the static flange portion 10'. The member 13 has first and second legs 13', 13" that axially overlap opposite radial surfaces of the outer cylindrical portion 12''' of the dynamic seal part. The first annular gap 14 is formed between a radially inner surface of the first leg 13' and a radially outer surface of the outer cylindrical portion 12'. The second annular gap 15 is formed between a radially outer surface of the second leg 13" and a radially inner surface of the outer cylindrical portion 12'. The axial gap is formed between opposing axial side faces of the U-shaped member 13 and the outer cylindrical portion.

Suitably, the radial dimension of the first annular gap 14, which is open to the environment E, is very small e.g. 0.5 mm, in order to restrict the entry of contamination. Preferably, the axial gap is larger in axial dimension, e.g. 1.5 mm, to accommodate axial displacements between the shaft 3 and the housing 4.

In the depicted embodiment, the second annular gap 15 of the second labyrinth seal 6 is non-constant in radial dimension. The second leg 13" of the U-shaped member has a small radial protrusion 16, which defines a collection space 17 for moisture and other contaminants. The protrusion 16 helps to prevent the entry of contaminants into the seal arrangement.

The flange portion 10' of the static seal part may be made from sheet metal and, in the depicted example, incorporates an S-shape in its radial mid-region. The U-shaped member may be made from a polymer material which is bonded or moulded to the static flange portion 10' at the S-shaped section. By doing so a proper definition of the location of the U-shaped member 13 is established by an undercut in radial direction which is formed by the "S". The undercut creates an axial extension for radially locating the U-shaped member. In other embodiments, the static flange portion 10' is straight in radial direction.

The invention is thus not restricted to the depicted embodiment, but is to be interpreted within the scope of the following claims.

Reference Numerals:

| Ref. No. | Description |
|---|---|
| 1 | Sealing arrangement |
| 2 | Bearing arrangement |
| 3 | Rotating machine part (shaft) |
| 4 | Stationary machine part (housing) |
| 5 | First labyrinth seal |
| 6 | Second labyrinth seal |
| 7 | Lip seal |
| 8 | Sealing lip |
| 9 | Cylindrical portion of static seal part |
| 10 | Static seal part |
| 10' | Flange portion of static seal part (static flange portion) |
| 11 | Annular gap of first labyrinth seal |
| 12 | Dynamic seal part |
| 12' | Mounting potion of dynamic seal part |
| 12" | Flange portion of dynamic seal part (dynamic flange portion) |
| 12''' | Outer cylindrical portion of dynamic seal part |
| 13 | U-shaped member |
| 13' | First leg of U-shaped member |
| 13" | Second leg of U-shaped member |
| 14 | First annular gap of second labyrinth seal |
| 15 | Second annular gap of second labyrinth seal |
| 16 | Radial protrusion on U-shaped member |
| 17 | Containing space (water collector) within U-shaped member |
| 18 | Radial protrusion on dynamic seal part |
| 19 | Pivoting point of sealing lip |
| E | Environment |
| a | Axis of rotation |
| α | Angle between sealing lip and rotation axis |
| L | Longitudinal extension of sealing lip |

The invention claimed is:

1. A sealing arrangement, for sealing a radial gap between a relatively rotatable inner component and an outer component, wherein the inner component is rotational about an axis of rotation and the outer component is coaxially arranged around the inner component, the sealing arrangement comprising:
   a dynamic seal part that is mountable to the inner component;
   a static seal part that is mountable to the outer component;
   a first labyrinth seal and a second labyrinth seal, each of the first labyrinth seal and the second labyrinth seal are formed by a gap between at least one set of opposing surfaces on the static and dynamic seal parts;
   a lip seal, wherein the lip seal is arranged radially between the first labyrinth seal and the second labyrinth seal,
   wherein the lip seal comprises a sealing lip which is connected to the dynamic seal part,
   wherein the lip seal bears against a radially oriented counterface on the static seal part,
   wherein the sealing lip has a longitudinal extension in a radial cross section that extends towards the axis of rotation at an angle of between ten degrees (10°) and eighty degrees (80°),
   wherein the radially oriented counterface is provided on a radially outer surface of a cylindrical portion of the static seal part,
      wherein the first labyrinth seal is at least partly formed by an annular gap between a radially inner surface of the cylindrical portion and a cylindrical mounting portion of the dynamic seal part that is mountable to the inner component,
      wherein the dynamic seal part comprises a protrusion that extends in a radially outward direction from the cylindrical mounting portion, at an axially inner side of the sealing arrangement, the protrusion radially overlaps the annular gap of the first labyrinth seal, the protrusion and the sealing lip are formed from the same material, and wherein the material is moulded to parts of the cylindrical mounting portion and a flange portion of the dynamic seal part.

2. The seal arrangement according to claim 1, wherein a contact interface between the sealing lip and the radially oriented counterface is lubricated with a grease.

3. A sealing arrangement, for sealing a radial gap between a relatively rotatable inner component and an outer component, wherein the inner component is rotational about an axis of rotation and the outer component is coaxially arranged around the inner component, the sealing arrangement comprising:
   a dynamic seal part that is mountable to the inner component;
   a static seal part that is mountable to the outer component;
   a first labyrinth seal and a second labyrinth seal, each of the first labyrinth seal and the second labyrinth seal are formed by a gap between at least one set of opposing surfaces on the static and dynamic seal parts;
   a lip seal, wherein the lip seal is arranged radially between the first labyrinth seal and the second labyrinth seal,
   wherein the lip seal comprises a sealing lip which is connected to the dynamic seal part,
   wherein the lip seal bears against a radially oriented counterface on the static seal part,
   wherein the sealing lip has a longitudinal extension in a radial cross section that extends towards the rotation axis at an angle of between ten degrees (10°) and eighty degrees (80°), wherein the second labyrinth seal comprises an axial gap between opposing axially oriented surfaces of the static and dynamic seal parts and
   the second labyrinth seal further comprises a first annular gap between a first set opposing radially oriented surfaces of the static and dynamic seal parts and a second annular gap between a second set of opposing radially oriented surfaces of the static and dynamic seal parts, wherein static seal part comprises a U-shaped member with a radially outer leg and a radially inner leg,
      wherein the dynamic seal part comprises an outer cylindrical portion, wherein the outer cylindrical portion is at least partly arranged between the radially outer and inner legs of the U-shaped member, such that the first and second annular gaps are created between the legs of the U-shaped member and the outer cylindrical portion.

4. The seal arrangement according to claim 3, wherein the radially inner leg of the U-shaped-member has a protrusion that extends in a radially outward direction, to establish a containing space in the U-shaped member.

5. The seal arrangement according to claim 3, the static seal part further comprises a flange portion to which the U-shaped member is attached.

6. The seal arrangement according to claim 5, wherein the flange portion has an S-shaped geometry in a radial cross section, wherein the U-shaped member is arranged on an axial extension that forms part of the S-shaped geometry.

* * * * *